Aug. 23, 1966 J. A. ZUPEZ ETAL 3,268,276

BEARING

Filed Dec. 26, 1963 6 Sheets-Sheet 1

Inventors
John A. Zupez
Llewellyn E. Hoyer
By Wallace, Kinzer and Dorn
Attorneys

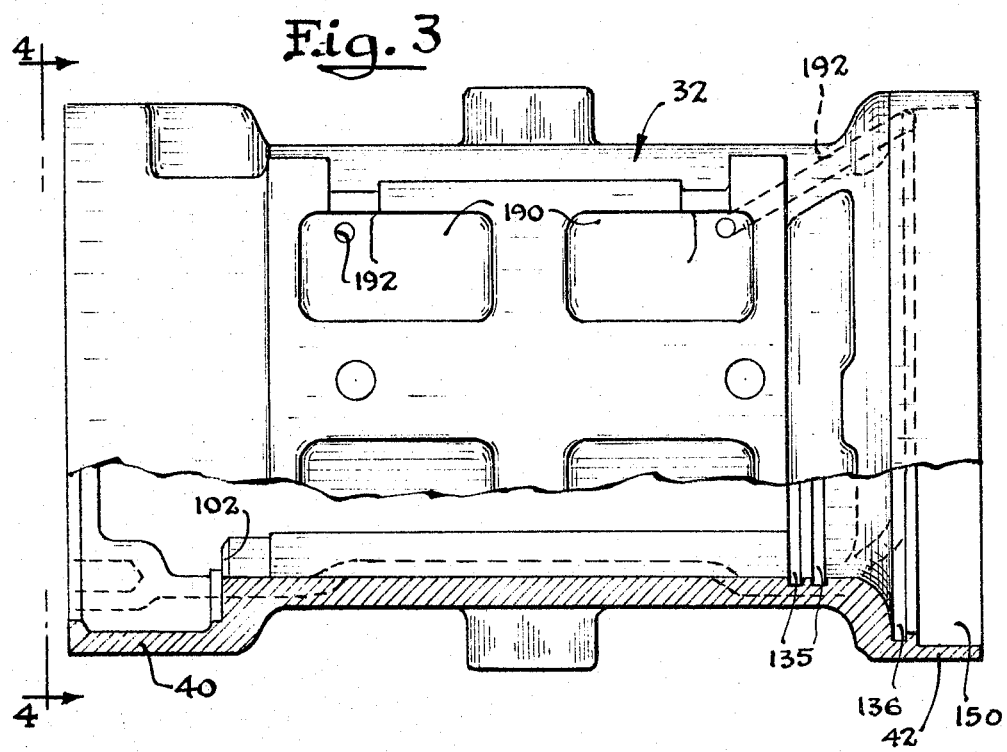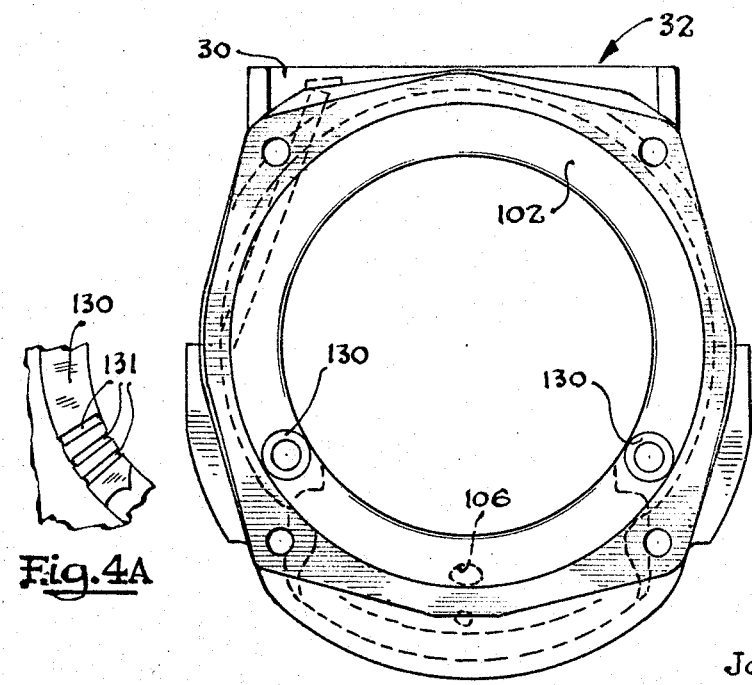

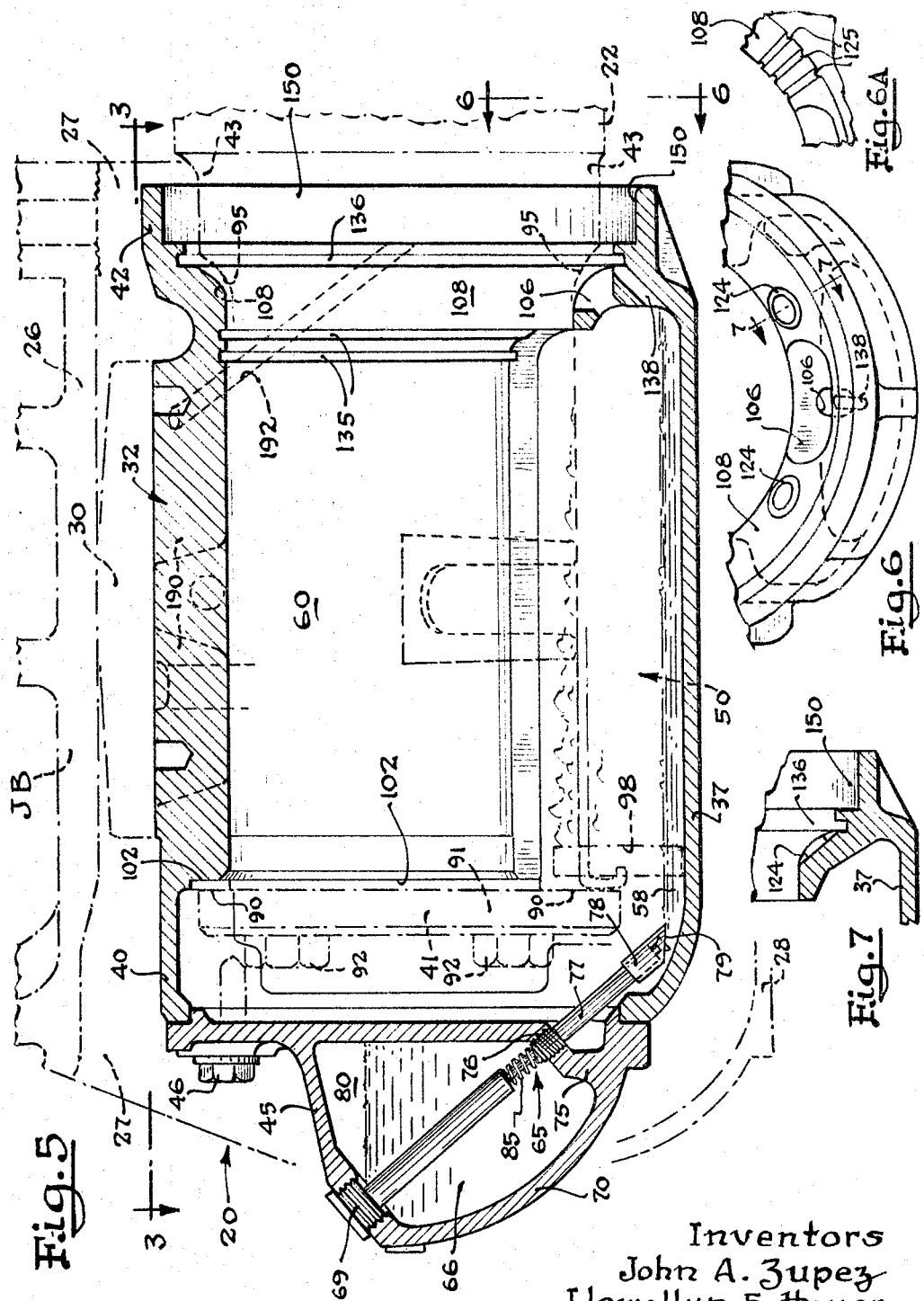

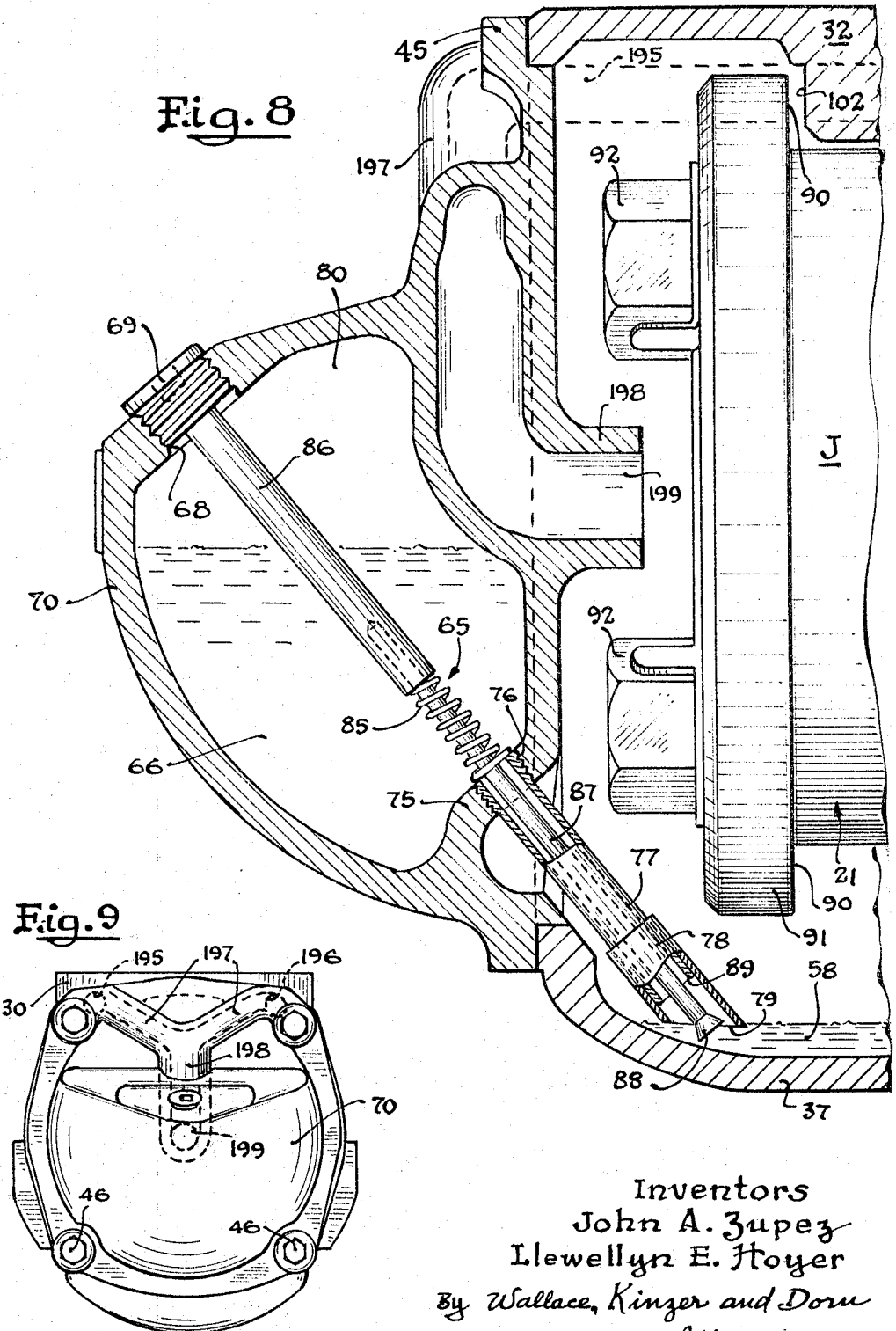

Aug. 23, 1966  J. A. ZUPEZ ET AL  3,268,276
BEARING
Filed Dec. 26, 1963  6 Sheets-Sheet 5
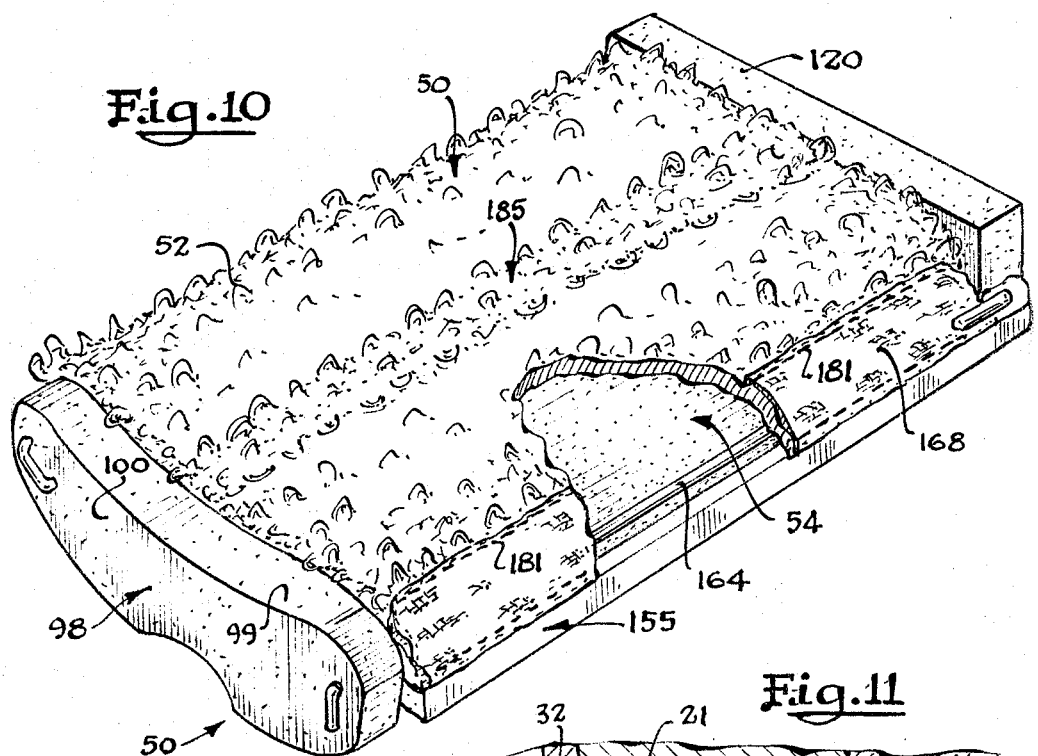
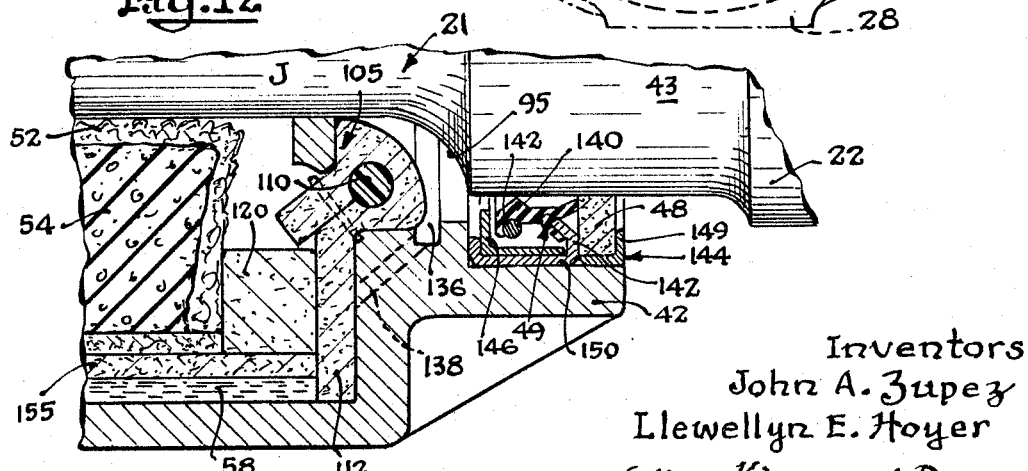
Inventors
John A. Zupez
Llewellyn E. Hoyer
By Wallace, Kinzer and Dorn
Attorneys Aug. 23, 1966  J. A. ZUPEZ ETAL  3,268,276
BEARING
Filed Dec. 26, 1963  6 Sheets-Sheet 6
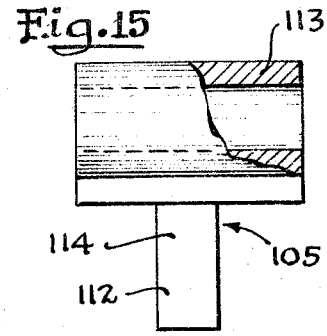
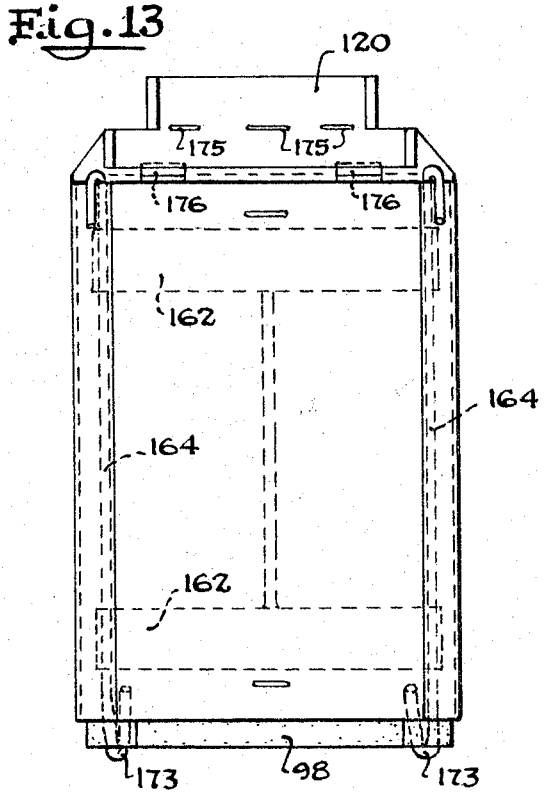
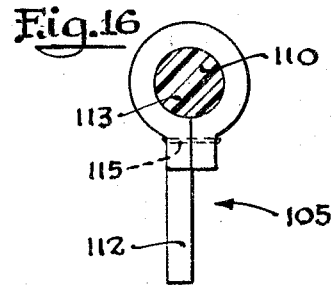
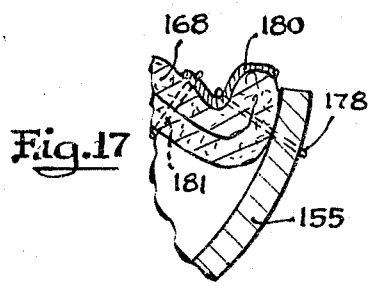
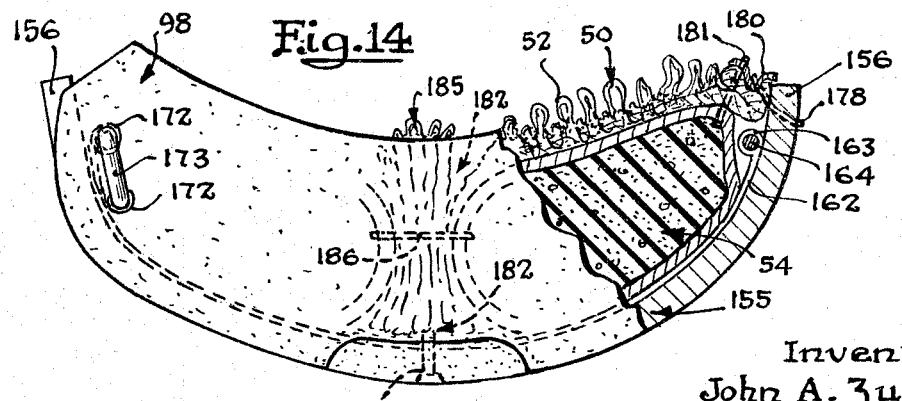
Inventors
John A. Zupez
Llewellyn E. Hoyer
By Wallace, Kinzer and Dorn
Attorneys United States Patent Office 3,268,276
Patented August 23, 1966

3,268,276
BEARING
John A. Zupez, Ridgewood, and Llewellyn E. Hoyer, Wayne, N.J., assignors to American Brake Shoe Company, New York, N.Y., a corporation of Delaware
Filed Dec. 26, 1963, Ser. No. 333,315
9 Claims. (Cl. 308—87)

This invention relates to lubrication of railroad journals and bearings, and more particularly to lubrication of a cartridge or sleeve-type bearing for a journal of a railroad car.

With the increase in speed of railway cars, it is of particular importance that the journal ends of the car axles be properly lubricated to prevent seizures or hazardous hot-box conditions. The journal is disposed to rotate in a bearing and the journal is lubricated by a lubricating element disposed in contact therewith. The axle is permitted to move in an axial direction relative to the bearing and is limited in the amount of axial movement by opposed radial thrust surfaces or flanges on the bearing, the bearing being held stationary relative to the rotating axle.

An object of the present invention is to achieve improved lubrication of the journal and bearing surfaces on a bearing by maintaining the amount of lubricant in the bearing at a constant level, applying the lubricant to opposed thrust surfaces of the bearing as well as to the main bearing surfaces, and diverting lubricant against escape from the main bearing area. More specifically, and according to a further object of this invention, a constant level valve is employed to regulate the flow of lubricant to main lubricating element and thrust lubricating elements, of novel arrangement, and cooperating grooves in the thrust bearing function to provide improved lubrication of the thrust surfaces of the journal and bearing.

According to a further object of the invention, improved lubrication of thrust surfaces is obtained by affording grooves in the thrust surfaces, which not only function to retain lubricant and thereby provide additional oil carrying capacity for the thrust surfaces, but also function as a scraping element to remove any soft bearing material from a journal thrust surface, thereby preventing the coating of the lubricating element with soft bearing material.

The maintenance of a proper level or amount of lubricant in an oil reservoir, both when filling the lubricant reservoir, and during later periods after use of lubricant, is a frequently encountered problem in connection with lubricating the journal of a railroad car axle. Accordingly, an object of the present invention is to provide a permanent type, additional capacity reservoir which is capable of being filled in place while a valve prevents over-filling with lubricant and which is capable of maintaining the lubricant level at a predetermined and constant level in the lubricating reservoir. In accordane with this object of the invention a separate and additional oil reservoir is provided, having a reserve capacity for oil. The reserve reservoir is connected to the lubricating reservoir by a valve to close the separate, reserve reservoir when a filling and inspecting plug is removed; and, when the plug is replaced, the valve is enabled to control the rate of flow of lubricant to the lubricating reservoir, so that a constant level of lubricant is maintained in the lubricating reservoir. Thus, another object of the invention is the provision of a valve which functions as a shut-off valve during the filling of the reserve reservoir, and which functions as an oil leveling valve when the oil level in the lubricating reservoir is dropping below the predetermined level for maximum lubricating efficiency.

In accordanc with a more specific object of the invention, an additional or reserve reservoir is provided on the front cover of the lubricating means with a filling and inspection plug sealing the additional reservoir unless this reservoir is being filled or inspected. The opening of the filling plug permits a spring biased plunger to close the valve so that during filling, only the reserve reservoir is filled. When the plug is replaced, the plunger of the valve is operated to open the valve which then functions as a constant leveling valve to permit lubricant to flow to the lubricating reservoir in order to maintain the oil level in the lubricating reservoir at a constant level.

In the sleeve-type of bearing to which the present invention has particular applicability, it is desirable to reduce rate of oil loss past an oil seal, and the present invention has for a further object, the retention of lubricant by collecting lubricant moving axially of the journal and returning the oil to the working area of the bearing. Under this object of the invention, the bearing is provided with circumferential grooves near the fillet surface of the bearing for collecting oil moving axially across the journal to prevent flooding of the oil seals and loss of lubricant and the collected lubricant is returned to the lubricant reservoir.

Under another aspect, and according to a further object of the invention, the lubrication of the collar thrust surfaces is obtained by a specially fitted lubricating pad on the main lubricating element engaging the collar end of the journal and applying lubricant thereto and lubrication of fillet thrust surfaces is obtained by a separate lubricating pad disposed in a slot in the fillet thrust flange of the bearing.

The invention features and has for a further object a novel lubricator pad for the journal having a base and upstanding ends of a heavy oil wicking material across which is stretched a fabric having chenille threads for conveying lubricant to the journal. The fabric is secured to base to enclose resilient lubricant absorbing elements and to enclose leaf springs disposed against the base to flex the base against the bottom of the support for the lubricator pad.

The present invention is, and has as its further object, an improved lubricating bearing of the 360° type, which affords a completely sealed bearing and lubricating system capable of beang applied to the journals of AAR approved railway car structures that require no alterations therein. In accordance with this object, the 360° bearing is formed with fillet and journal thrust bearing flanges having oil collecting and bearing scraping grooves therein, and is provided with a slot in the fillet thrust flange for receiving a lubricating pad for the fillet thrust surface of the journal. Also, a front cover is secured to the bearing casting and has formed therein a supply reservoir, which is connected by a valve sealable passage to the lubricating reservoir of the bearing, in which is disposed a lubricating means. The valve functions to prevent overfilling the lubricating reservoir within the bearing, and the maintaining of a constant level of oil within the lubricating reservoir.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

FIG. 3 is a plan view of the 360° bearing taken along the line 3—3 in FIG. 5 in the direction of the arrows;

FIG. 4 is a front end view of the 360° bearing taken along the lines 4—4 in FIG. 3;

FIG. 4A is a fragmentary view showing grooves in a thrust bearing surface;

FIG. 5 is a sectional view showing the 360° bearing mounted on a journal and disposed within a journal bearing;

FIG. 6 is an end view taken along the line 6—6 in the direction of the arrows of FIG. 5 showing the thrust bearing at the fillet end of the journal;

FIG. 6A is a fragmentary view of grooves on the thrust surface at the fillet end of the journal;

FIG. 7 is a sectional view taken along a line 7—7 in the direction of the arrows in FIG. 6;

FIG. 8 is an enlarged sectional view showing the oil reservoir and valve according to the preferred embodiment of the invention;

FIG. 9 is a front view of the cover plate;

FIG. 10 is a perspective view of the lubricating pad constructed in accordance with a preferred embodiment of the invention;

FIG. 11 is a section view showing lubricating pads disposed in contact with a journal;

FIG. 12 is an enlarged sectional view showing a fillet lubricating pad disposed in a seat in the thrust bearing of the 360° bearing;

FIG. 13 is a plan view of a felt stiffener pad for the lubricating pad;

FIG. 14 is an enlarged view with a section broken away showing the interior of the lubricating pad;

FIG. 15 is a sectional view of the fillet lubricator;

FIG. 16 is an end view of the fillet lubricator with a resilient pad therein; and FIG. 17 is a fragmentary view showing a stitching of a chenille cover to a felt pad in the lubricating pad.

Figure 1:
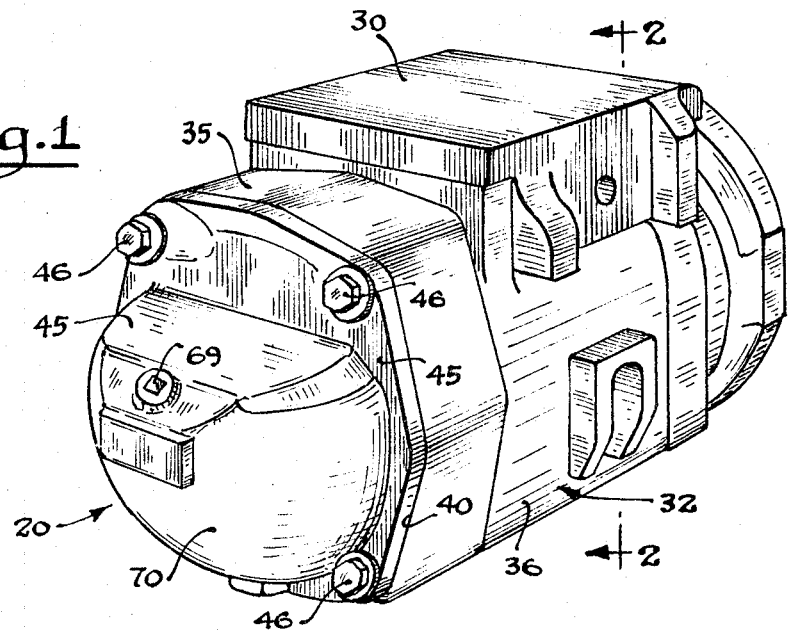
FIG. 1 is a perspective view of a cartridge-type bearing constructed in accordance with the preferred embodiment of the invention.

Referring now to the drawings and more particularly to FIGS. 1 and 5, there is shown a one-piece 360° sleeve type cartridge bearing 20, FIG. 1, which is adapted to be mounted on the end of a journal J, FIGS. 8 and 12, of railway axle 22 disposed in journal box JB, which is shown in dotted lines in FIG. 5. The journal box JB is of standard construction and dimension and includes a top wall 26 leading to generally parallel side walls 27, FIGS. 5 and 11, which in turn lead to an internally rounded bottom wall 28. As shown, the dimensions of the journal box JB are such that the cartridge bearing 20 is spaced inwardly of the walls of the journal box JB. At the top of the journal box JB, a conventional wear plate 30 is wedged between the top wall 26 of the journal box, and a bearing casting 32, FIG. 5, of the cartridge bearing 20.

While the bearing of the present invention is described hereinafter as being disposed within the journal box JB, it will be understood that the invention and the cartridge bearing 20 are capable of being mounted on the journal of a pedestal type railway car truck as well. Also, it is to be understood that various aspects of the lubricating system for the journal 21 are capable of being employed with the so-called segment or 180° type of conventional journal bearing, as well as with a 360° bearing casting as will be apparent to those skilled in the art from the description hereinafter.

Figure 2:
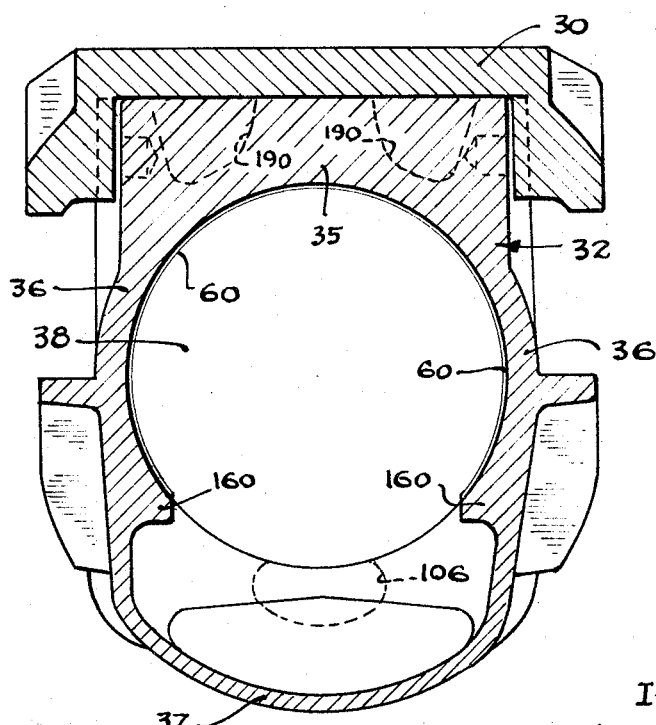
FIG. 2 is a sectional view taken along the lines 2—2 in FIG. 1 in the direction of the arrows showing a section through the bearing cartridge.

The bearing 32 is a cast hollow sleeve having a rounded top wall 35, FIGS. 1 and 2, with rounded side walls 36 continuing from the top wall and a rounded bottom wall 37 continuing from the side walls, enabling the bearing to be readily slipped on to a reduced diameter portion 21 of the journal J of the car axle 22, as will be apparent from FIG. 5.

The bearing bore 38, FIG. 2 is preferably lined centrifugally with a lining of bearing material such as to reduce friction between the journal and bearing material. The bore thus lined has a diameter just slightly larger than the diameter of the reduced portion of the journal J. The bearing 32 is preferably cast from a bronze bearing metal, although other types of metal such as cast aluminum bearing metal, malleable iron, versalloy or the like can be employed.

As best seen in FIG. 5, the bearing 32 extends in an axial direction from an annular collar portion 40 encircling a collar plate 41 secured on the journal J to an annular dust guard portion 42 encircling an enlarged diameter or dust guard portion 43 of the journal J. The cartridge bearing 20 is sealed at the collar end portion 40 by a front cover or face plate 45, FIGS. 1, 5 and 8, which is secured to the bearing casting 32 by threaded bolt type fasteners 46. The bearing is sealed at the opposite or fillet end by a felt dust guard seal 48, FIG. 12, and a rubber oil seal 49, FIG. 12, in sealing engagement with the entire peripheral surface of the enlarged diameter portion 43 of the journal J. Thus, with the cartridge bearing 20 placed in a journal box JB, the journal J and the interior bore 38 of the bearing casting 32, are completely sealed from dirt or other foreign matter which might contaminate the lubricant or the bearing surfaces and the journal rotating therein. Conversely, the lubricant is sealed in the bearing against loss to the atmosphere past the oil seal 49.

The journal J is lubricated by a main lubricator or lubricating pad means 50, FIG. 10, disposed on the bottom wall 37 of the bearing casting 32, with an upper chenille fabric 52 in engagement with the lower peripheral surface of the journal J as shown in FIG. 5. As will hereinafter be described in greater detail, the lubricator 50 embodies inserts of oil absorbent sponge rubber or the like 54, FIG. 10, which are disposed at their bottom portions in a pool or reservoir 58 of lubricant FIGS. 5 and 8. The oil absorbent pads 54 convey lubricant to the chenille fabric 52 where the oil is applied to the lower peripheral surface of the journal J, by which the oil is conveyed during rotation of the journal J to the Babbitt lining along the main bearing surfaces 60, FIGS. 5 and 2.

In a conventional lubricating system employing lubricator pads or other conventional forms of lubricating devices, all of the lubricant is disposed directly in the bottom of the journal box or in the bottom of the cartridge bearing, so that when the journal box or cartridge bearing is filled with lubricant, the level of the lubricant is quite high with respect to the bottom of the journal, and with useage and elapse of time, the oil level slowly lowers from that which originally was the level at the time of filling. Usually, optimum lubrication is obtained when the oil level is intermediate its highest level at filling, and its lowest level after a considerable period of time and useage, so that the best lubrication conditions are available only for a short period of time when the oil level is at the optimum level.

In accordance with the present invention, the oil level within the bearing casting 32 is maintained at what is considered the optimum level for lubrication by valve means 65, FIG. 8, which is controlled by the level of lubricant in the bottom portion or reservoir 58 in the bearing casting 32. The valve means 65 functions to admit oil from a supply or reserve oil reservoir 66 to raise the level of the oil in the reservoir 58 when the oil level in reservoir 58 falls below the prescribed optimum level. Furthermore, the valve means 65 functions as a shutoff valve to prevent the raising of the oil level within the reservoir 58 to above the optimum level by sealing the reservoir 66 against supplying oil to the reservoir 58 when the reservoir 66 is being filled with lubricant through an opening 68 normally closed by the threaded plug 69.

As best observed from FIGS. 1, 5 and 8, the oil reservoir 66 is formed by a hollow, cast, shell-like protuberance 70 integrally formed on the cover plate 45. As seen in FIG. 1, the plug 69 seals the only exterior opening 68 into the cavity 66. The opening 68 remains sealed by the plug 69 unless the plug is removed for inspection or filling through the opening 68.

Within the reservoir 66, the lower interior wall 75 has a threaded opening 76 therein, in which is threaded a hollow, cylindrical valve tube 77 of the valve means 65. This tube communicates with the chamber 66 at its upper open end. Secured on the lower end of the valve tube 77 is a tubular valve member 78, the end 79 of which is cut obliquely to the axis of the valve member 78 and parallel with the bottom of the reservoir 38. Thus, the oblique end 79 on the valve member 78 is disposed parallel with the surface of the lubricant in reservoir 58. Inasmuch as the oblique end 79 on the valve member 78 is disposed at the level at which the oil lubricant 58 is to be maintained, a drop in the level of the lubricant 58 below the end 79 of the valve member 78 opens the valve member to the air pressure within the journal casting 32, and this is communicated to the chamber 66 through the upper open end of the tube 77. Conversely, when the oil level is at the desired level or thereabove, the opening 79 is disposed below the surface level of the oil so that the opening 79 is not exposed to the air pressure within the journal casting 32.

As the lubricant in the reverse reservoir 66 is supplied to the reservoir 58, the oil level in the reserve reservoir 66 lowers, as shown in FIG. 8, and a partial vacuum is formed in the air pocket 80 above the level of the oil in the reservoir 66. The partial vacuum prevents the oil in the reservoir 66 from flowing through the open valve into the reservoir 58 so long as the open end of valve member 77 is below the surface level of the lubricant.

However, as the lubricant is used, the level of the lubricant drops and exposes the opening 79, whereupon the air pressure within the bearing 32 is communicated through tube 77 to chamber 66 and thereby equalizes the partial vacuum in the reservoir 66, permitting oil in the reservoir 66 to flow into the reservoir 58 until the oil level rises to seal again the opening 79 with a layer of oil. Thus, the level of the oil is maintained at a constant level by means of the partial vacuum 80 formed in the air tight reservoir 66 due to loss of oil therein, and by the exposing and covering of the opening 79 at the end of the valve tube 77.

The valve means 65 functions as a shutoff valve when the plug 69 is removed for the purpose of sealing the valve tube 77 and thereby the reservoir 66 during either an inspection or filling of the reservoir 66. Upon removal of the plug 69, a coiled, compression spring 85 forces an upper rod 86 to move upwardly through the opening 68, and thereby move an attached lower valve rod 87 upwardly to bring a conical valve tip 88 thereon into seating engagement with a complementary valve seat 89 of the valve tube 77.

The valve tip 88 seats on the valve seat 89 and seals the valve tube 77 against flow of oil from the reservoir 66 to the reservoir 58, so long as the plug 69 is removed. Thus, the oil level in the reservoir 58 cannot be substantially increased above the optimum level by a person inadvertently pouring too much oil into the reservoir 58. Moreover, the oil level is more easily inspected with the reservoir 66 than with the conventional long flat reservoir on the bottom of a journal bearing or box, and the proper amount of lubricant can be easily measured merely by filling the reservoir 66 without concern as to how much oil is already in the reservoir 58.

While the supply reservoir 66 and valve means 65 are shown herein as being employed with a sleeve type journal, it is to be understood that they could also be applied to regulate flow of lubricant to a journal box, wherein the lubricator and reservoir of oil for the journal are disposed directly in the journal box.

The lubricating means 50 is adapted to lubricate the bottom peripheral portion of the journal J. The lubricating means, herein employed, also is uniquely constructed to lubricate an annular thrust surface 90, FIGS. 5 and 8, on a collar 91 secured by bolt-type fasteners 92 to the end of the journal J, and to lubricate a fillet thrust surface 95, FIGS. 5 and 12, which is a curved surface joining the smaller diameter journal end portion and the enlarged diameter portion 43 of the journal J. As illustrated in FIG. 5, the thrust surface 90 on the collar 91 is adapted to move into engagement with a felt lubricating pad 98, which has an upper arcuate surface 99, FIG. 10, for engaging the bottom peripheral surface of the journal J adjacent the chenille fabric 52 and a radially disposed side wall surface 100 adapted to contact directly the thrust surface 90 on the collar 91.

As best seen in FIGS. 4 and 5, the bearing casting 32 has an annular bearing flange with a thrust surface 102 extending circumferentially about the bearing casting 32 and adapted to engage the thrust surface 90 on the collar 91, when the journal 21 moves rightwardly as viewed in FIGS. 5 and 8, to bring the thrust surfaces 90 and 102 into engagement with one another. The collar 91 moves during and with the rightward axial movement of the attached journal J, FIG. 8, to engage the collar thrust surface 91 with the thrust surface 102 and thereby limit rightward movement of the journal J relative to bearing casting 32.

The fillet thrust surface 95 is lubricated by a special lubricating pad 105, FIG. 12, which is disposed in a slot or opening 106, FIGS. 5 and 6, in a fillet end thrust bearing surface 108. The opening 106 includes an elongated lubricator receiving seat and a passage leading to the oil reservoir 58. As best seen in FIG. 5, the fillet bearing surface 108 on the sleeve bearing casting 32 is a convex bearing surface adapted to engage the concave thrust surface 95 on the journal 21. The fillet thrust surface 108 limits the leftward movement of the journal 21 relative to bearing casting 32, as seen in FIG. 12.

The fillet thrust lubricator 105 consists of a relatively small piece of felt with the upper portion looped to enclose a small elastomer or resilient interior cylinder or member 110, FIGS. 12 and 16. As best seen in FIG. 15, the lubricator 105 is constructed from a one-piece felt pad 112 of generally T-shaped configuration with an upper head portion 113 looped and secured to a narrow leg portion 114 by stitches 115, FIG. 16. The fillet lubricator 105 has a general shape shown in FIGS. 15 and 16, when constructed, but when forced within the receiving opening 106 in the thrust bearing 108 and engaged by the fillet surface 95 of the journal 21, the fillet lubricating pad 105 assumes the general configuration shown in FIG. 12, with the leg 114 bent downwardly into the oil reservoir 58 to wick oil or the lubricant upwardly to the fillet thrust surfaces 95 and 108. The leg 114 is abutted against a felt end pad 120 disposed at the collar end of the lubricator 50.

To accomplish better lubrication of the thrust surfaces at both the collar and fillet ends of the journal J and journal bearing casting 32, the thrust surfaces 102 and 108, respectively, are each provided with oil retaining grooves 124 and 130, FIGS. 4 and 6. As shown in FIG. 6, a pair of circular grooves 124 are cut or otherwise formed beneath the surface level of the convex surface 108 and as lubricant is distributed about the fillet thrust surfaces 95 and 108 from the fillet lubricating pad 105, the circular grooves 124 become filled with lubricant and function as additional lubricating means for holding and applying lubricant to the thrust surfaces 95 and 102 of the journal 21.

The grooves 124 perform an additional function in that the grooves 124 serve as scrapers to scrape from the journal 95 any Babbitt or bearing metal which might be thereon due to contact with the thrust surface 108. If the Babbitt metal is not collected or scraped from the journal thrust surface 95, the Babbitt metal tends to smear on the fillet lubricator pads 105 and cause a substantial decrease in the lubricating capability of the lubricator 105 because of the film of Babbitt thereon.

While the oil retaining and scraping grooves 124 for the fillet thrust surface 108 are shown as being circular in FIG. 6, it is understood that these grooves could be of other configurations such as the straight line grooves 125 shown in FIG. 6A.

In FIGS. 4 and 4A, the collar end of the 360° bearing casting 32 is shown with a pair of circular oil retaining grooves 130 formed therein for collecting returning lubricant from the collar lubricating pad 98 on the lubricating means 50, and for serving as a scraping edge to remove Babbitt that would otherwise smear across the side wall 100 of the collar end lubricator 98, thereby limiting its effectiveness as a lubricating element. The straight line grooves 131 can be employed in lieu of the circular grooves 130 in the collar end thrust surfaces 102 on the bearing casting 32.

In practice, it has been found that the lubricant applied to the journal 21 by the lubricating means 50 proceeds to work itself axially along the journal J and lining 60, and then outwardly across the oil seal 49 and dust seal 48, whereupon the lubricant is lost to the atmosphere. Not only does this condition cause an increased consumption of oil, but also this condition renders a hot-box condition more likely due to the rapid depletion of oil. To lessen the escape of the lubricant in an axial direction past an oil seal such as the oil seal 49, the bearing casting 32 is provided with a pair of spaced annular grooves 135, FIG. 5, in the interior wall of the bearing 32 just before the fillet thrust surface 108. Thus, as the lubricant between the Babbitt lining 60 and the journal 21 works its way axially out of the bearing 32, the lubricant is trapped or diverted by grooves or channels 135 to be directed downwardly to the reservoir of lubricant 58, whereupon the lubricant again can be furnished to the working area of the bearing 32.

An additional oil sealing groove 136, FIG. 5, is provided just immediately adjacent the oil seal 49 and also serves to divert oil tending to escape past the oil seal 49 downwardly to a connecting conduit 138 leading to the reservoir 58. The conduit 138 is in the portion of the thrust bearing 108 immediately below the opening 106 in which the lubricator pad 105 rests.

Lubricant moves across the journal 21 in axial direction to an oil seal 49, the movement being greatest across the upper circumferential surfaces of the bearing and journal 21. The oil seal 49 has a scraping edge 140, FIG. 12, disposed in contact with the journal 21 about its entire peripheral surface to prevent axial movement of lubricant therepast. The oil seal 49 carried in a wide annular, circumferential surface 150 formed in the dust guard portion 42 of the bearing casting 32. The scraping point 140 is a pointed scraping edge of rubber or the like which is held in tight sealing engagement with the enlarged portion 43 of the journal J by a circular garter spring 142 disposed within a fabricated insert 144 having a pair of spaced and inwardly directed flanges 145 and 146 spaced from the journal 21. The flange 145 has an oblique end portion seated within a forked section in the rubber seal 49 to hold the seal against rightward axial movement. The seal is prevented from axial movement in a leftward direction by the flange 146. Thus, the insert 144 is disposed in the annular groove or shoulder 150, FIG. 5, of the bearing casting 32. The dust seal 48 is an annular ring of felt or other dust sealing material and is carried in annular holder ring 149 having an L-shaped section. When in proper position on the shoulder 150, the dust seal 48 is held between the flange 145 and outer flange portion of the holder ring 149.

Referring now to FIGS. 10, and 13–17 inclusive, the lubricating means 50 and the various components thereof are shown in greater detail. The lubricating means includes a bottom base 155 preferably made of felt and adapted to be seated on the bottom of the bearing casting 32. As seen in FIG. 11, the felt pad 155 is disposed to conform to the bottom 37 of the bearing casting and the longitudinal sides 156 of the base extending upwardly adjacent the bottom of cross-sectional columns 160 on the bearing casting 32. The felt pad 155 is urged to conform against the bottom and lower side walls of the bearing casting 32 by a pair of spring steel clips or leaf springs 162, FIGS. 13 and 14, which attempt to expand the longitudinally extending sides 156 of the felt pad 155 away from each other, and which, in so doing, tend to flatten or straighten the lubricating means 50 including the chenille fabric 52, thereby forcing the fabric 52 into tighter engagement with the bottom of the journal J.

As seen in FIG. 14, the spring steel clips 162 have opposed circular eyes or looped ends 163 which are aligned with similar ends on the other clip 162 and through which is inserted a longitudinally extending wire 164. At the collar end of the lubricating means 50, the ends of the wires 164 have hooks 173 inserted through preformed openings 172 in the collar lubricating end pad 98 for the purpose of securing this felt end pad 98 to the chenille fabric 52 and to the lubricating means 50. That is, the opposite ends of the wires 164 are looped or hooked upwardly over a marginal canvas backing portion 168 on the chenille fabric 52 to secure the end felt pad 98 and wires 164 to the chenille fabric 52 and thereby to the lubricating means 50.

As will be seen in FIG. 10, the base 155 is constructed of a considerably thinner piece of felt than the pieces of felt for end pads 98 and 120. Specifically, the felt base 155 is approximately 3/16 of an inch in thickness, whereas the collar felt end pad 98 is approximately 1/2 of an inch in thickness and the fillet felt end pad 120 is approximately 3/4 of an inch in thickness.

The fillet felt end 120 is a separate piece of 3/4 inch felt and is of generally a T-shaped configuration, FIG. 13, and rests on a complementary shaped portion formed on the end of the bottom felt 155. The fillet end fillet 120 is secured to this end of the felt base 155 by a plurality of spaced staples 175, FIG. 13.

To hold the inserts 54 against longitudinal movement, small end straps 176, FIG. 13, are sewn between the cover 52 and the base 155 at the open ends of longitudinally extending pockets in which the inserts 54 are contained.

As best seen in FIGS. 10 and 17, the chenille cover 52 is is attached to the felt base 155 by means of stitches 178. During assembly of the lubricating means 50, a twill or canvas binder strip 168 is sewn first to the chenille fabric 52 by stitches 181 along the two opposite end portions of the chenille cover 52. Then, during the final assembly of the lubricator, the stitches 178 are sewn through both the binder 168 and the chenille fabric 52, as best seen in FIG. 17, to secure the fabric 52 to the base 155. In addition to affording a holding element for the stitches, the binder 168 serves the purpose of keeping the chenille threads away from the bearing at the ends of the lubricating means 50, thereby avoiding what is commonly known in railroad terminology as "waste grabbing."

The chenille fabric 52 is joined at the center thereof to the base 155 by a longitudinally extending row of stitches 183, FIG. 14. The stitches 183 divided the chenille fabric 50 into a pair of axially extending pockets for oil absorbent inserts 54. As seen in FIG. 14, a separate, center panel of chenille 185 is inserted in a central cavity 182 formed by the stitches 183. The top portion of the center panels 185 extends slightly above the surface of the chenille fabric 52 to provide a medial and additional wicking element for supplying oil to the journal 21. The center panel 185 is secured in the cavity 182 of the chenille fabric 52 by a row of transversely extending stitches 186.

The moving of the journal 21 back and forth in the sealed bearing casting 32 is much like that of a piston within a cylinder and has been konwn to cause a reduction in the air pressure within the bearing 32 thereby creating a partial vacuum which enhances the entering of airborne dirt and foreign material with outside air seeking to equalize the air pressure in the bearing. To protect against such occurrence, vent slots have been employed to supply atmosphere pressure to the inside of the bearing casting 32 so as to insure an equalization of air pressure within and without the bearing casting 32. As heretofore proposed, dust gathering pockets 190, FIGS. 3 and 4, have been provided on the outer exterior surface of the bearing casting 32 so as to be disposed beneath the wear plate 30 with small passages leading to the atmospheric pressure or air, whereby as air enters the dust chambers 190, any foreign matter is precipitated and collected. Holes or channels 192 are drilled from portions within the dust chambers 190 above the bottom of the chambers 190 to provide a vent channel 192 for supplying air to the interior of the bearing sleeve 32. As seen in FIG. 5, a channel 192 extends at an oblique angle between the pocket 190 to the groove 136, and thereby vents outside air to the interior of the bearing sleeve 32.

The channel 192 is made at an oblique angle so that when the railroad car is tipped or turned over, the end of the channel 192 intersecting the groove 136 is not disposed at the bottom or below the level of the newly formed pool of oil so as to readily conduct oil into the pocket 192 from which the oil could flow to the atmosphere.

At the collar end of the bearing sleeve 32, another diagonal vent channel can be made leading from a duct chamber 190, or alternatively, and preferably, a pair of horizontal vent conduits 195 and 196, FIG. 8, can be made leading to aligned conduits 197 in a front cover 70 of the type shown in FIG. 8, which is provided with these conduits 197 as well as the reservoir 66. The spaced conduits 197 converge to a central conduit 198 forming a Y-shaped or forked branched conduit with a common and central opening 199 located opposite the center of the journal J and collar 91. Thus, air is vented from spaced dust chambers 190 through conduits 195 and 196 to the branch conduits 197 converging to conduit 198 opening in the interior of the bearing 32. Thus, when a railroad car is tilted or turned over, a lubricant from the reservoir 58 will move around the sides of the bearing casting 32 and journal 21 to be disposed on the normally upper, and now downwardly, portions of the bearing casting 32. However, the opening 199 in the vent channel 198 will be disposed above the level of the oil so that the oil cannot drain into the dust channels 192 and thus be lost.

From the foregoing, it will be seen that the present invention discloses a novel manner of lubrication of a journal and, to this end, employs specially fitted thrust lubricating means, a constant level lubricating reservoir, and lubricating grooves on the bearing. More specifically, there is provided special collar and fillet lubricating elements for lubricating the thrust surfaces of the collar and fillet ends of the journal and the matching thrust surfaces on the bearing. Additionally, the thrust surfaces on these bearings are provided with grooves which perform the dual functions of retaining oil or lubricant for the thrust surfaces and for scraping bearing material from the journal thrust surfaces to prevent the smearing of the bearing metal on the thrust surface lubricating means.

Also, it will be seen that the level of lubricant in the reservoir 58 is kept at a constant level by a valve means 65. The valve means 65 also functions as a shut-off valve to seal a filling or supply reservoir 66 whereby the level of oil can easily be inspected and maintained without overfilling with lubricant.

At the fillet end of the journal, a separate lubricating pad is disposed in a slot in the thrust surface of the bearing to lubricate the thrust surfaces of the journal and bearing at the fillet end of the journal. Additionally, oil collecting grooves are formed in the bearing at the fillet end of the bearing to collect oil moving axially from the working area of the bearing to the oil seal and to return the oil back to the working area of the bearing.

Additionally, the bearing is provided with vents for supplying air to the interior of the bearing and the vents are so formed to be above the surface of the pool of lubricant within the bearing irrespective of whether or not the railroad car is turned completely over, that is, tilted through 180°.

Hence, while preferred embodiments of the invention have been described and illustrated, it is to be understood that they are capable of variation and modification, and we therefore do not wish to be limited to the precise details set forth, but desire to avail ourselves of such changes and alterations as fall within the purview of the following claims.

We claim:

1. In a bearing for a journal with a dust guard seat and a thrust surface, an integral body member in the form of a one-piece sleeve affording an internal bore in which said journal may be disposed for rotation, said body member having an inner, rounded wall lined with a bearing material and providing the main bearing surface for said journal, said inner and rounded wall terminating to form an opening in a lower portion thereof, integral walls on said body member forming a reservoir below said opening for exposing said journal for lubrication, an integral annular collar formed on said body member at one end thereof for encircling about the dust guard seat of the journal, a thrust flange having a thrust surface separating said collar from said inner, rounded wall, a passageway in said thrust flange to said reservoir to conduct lubricant to said thrust surface, circumferentially extending groove means in said inner, rounded wall adjacent said thrust flange for diverting lubricant moving toward said thrust flange and collar to return the lubricant to said reservoir.

2. In the bearing of claim 1, circumferentially extending groove means formed in said collar to collect lubricant in said collar, and a second passageway in said thrust flange to return lubricant from said last-mentioned groove means to said reservoir.

3. In the bearing of claim 1, wherein a separable cover means is secured to another end of said body member, said cover means including an additional lubricant reservoir means, and valve means for controlling the flow of lubricant from said additional lubricant reservoir means to said first mentioned reservoir.

4. The bearing of claim 1 including independent groove means in said thrust surface for collecting lubricant and scraping bearing material from a thrust surface on said journal.

5. In the bearing of claim 1, seat means formed in said thrust flange, thrust surface lubricating means disposed in said seat means, said lubricating means including a resilient means in said seat means to expand said lubricating means beyond said fillet thrust surface in the bearing for engagement with said thrust surface on said journal, said lubricating means also including a portion extending through said passageway to convey lubricant from said reservoir.

6. In the bearing of claim 5, a main lubricating means disposed in said reservoir and extending into said opening for engagement with said journal, said lubricator having an upstanding end pad with a radial directed face for engagement with a thrust surface on an end collar secured to said journal.

7. In a bearing for a journal of a railroad car wheel axle, an integral body member in the form of a one-piece sleeve affording an internal bore in which said journal may be disposed for rotation, said body member having an inner, rounded wall providing the main bearing surface for said journal, said inner and rounded wall having an opening in a lower portion thereof, integral walls on said body member forming a reservoir chamber below said opening for exposing said journal for lubrication, a lubricator disposed in said reservoir chamber and extending to said opening for lubricating said journal, circumferentially extending grooves in said sleeve for returning lubricant to said reservoir chamber, an integral annular collar formed on said body member at one end thereof to encircle the dust guard seat of the journal, a thrust flange having a thrust surface separating said collar from said inner, rounded wall, a passageway formed in said thrust flange and extending to said reservoir chamber, fillet lubricating means including a portion extending through said passageway and including a resilient portion extending beyond said thrust surface for engagement with a fillet thrust surface on said journal, an end pad on said lubricator having a radially directed face to engage the thrust surface on said collar secured to said journal, a cover secured to said other end of said body member and having a hollow interior serving as an additional lubricant reservoir, and valve means controlling flow of said lubricant from said hollow interior of said cover member to said reservoir chamber.

8. The bearing of claim 7 wherein said cover member has vent passageways therein, said bearing sleeve having dust pockets formed on the outer surface thereof, said bearing sleeve having passageways leading from said dust pockets to said vent passageways of said cover member, said vent passageways of said cover member opening into said bore at the center thereof.

9. The bearing of claim 7 wherein said valve means includes a conduit extending diagonally from said hollow interior of said cover member to said reservoir chamber, said conduit having a terminal end in said reservoir with an end at a plane at a predetermined height above the bottom of said reservoir chamber, a spring biased valve stem movable to close the bore of said conduit to oil flow therethrough, said cover member having an opening therein, and a closure member for closing said opening and holding said valve stem to open the bore of said conduit.

References Cited by the Examiner
UNITED STATES PATENTS

| | | | |
|---|---|---|---|
| 325,966 | 9/1885 | Pierce | 308—243 |
| 1,416,884 | 5/1922 | Schmidt | 308—132 |
| 1,745,216 | 1/1930 | Horger | 308—187 |
| 2,126,205 | 8/1938 | Murphy | 308—83 |
| 2,242,262 | 5/1941 | Ray | 308—187 |
| 2,500,454 | 5/1950 | Evans | 308—187 |
| 2,798,776 | 7/1957 | Harkenrider | 308—243 |
| 2,827,343 | 3/1958 | Cox | 308—132 |
| 2,919,964 | 1/1960 | Evans | 308—243 |
| 2,926,970 | 3/1960 | Clark | 308—83 |
| 2,946,631 | 7/1960 | Cox | 308—83 |
| 2,969,259 | 1/1961 | Rykoskey et al. | 308—79.1 |
| 2,997,348 | 8/1961 | Cox | 308—83 |
| 3,151,917 | 10/1964 | Hennessy | 308—83 |
| 3,199,173 | 8/1965 | Lefevre | 308—135 |

FOREIGN PATENTS

| | | |
|---|---|---|
| 638,882 | 3/1962 | Canada. |
| 641,212 | 5/1962 | Canada. |
| 663,245 | 8/1938 | Germany. |

DAVID J. WILLIAMOWSKY, *Primary Examiner.*

FRANK SUSKO, *Examiner.*